Figure 1:
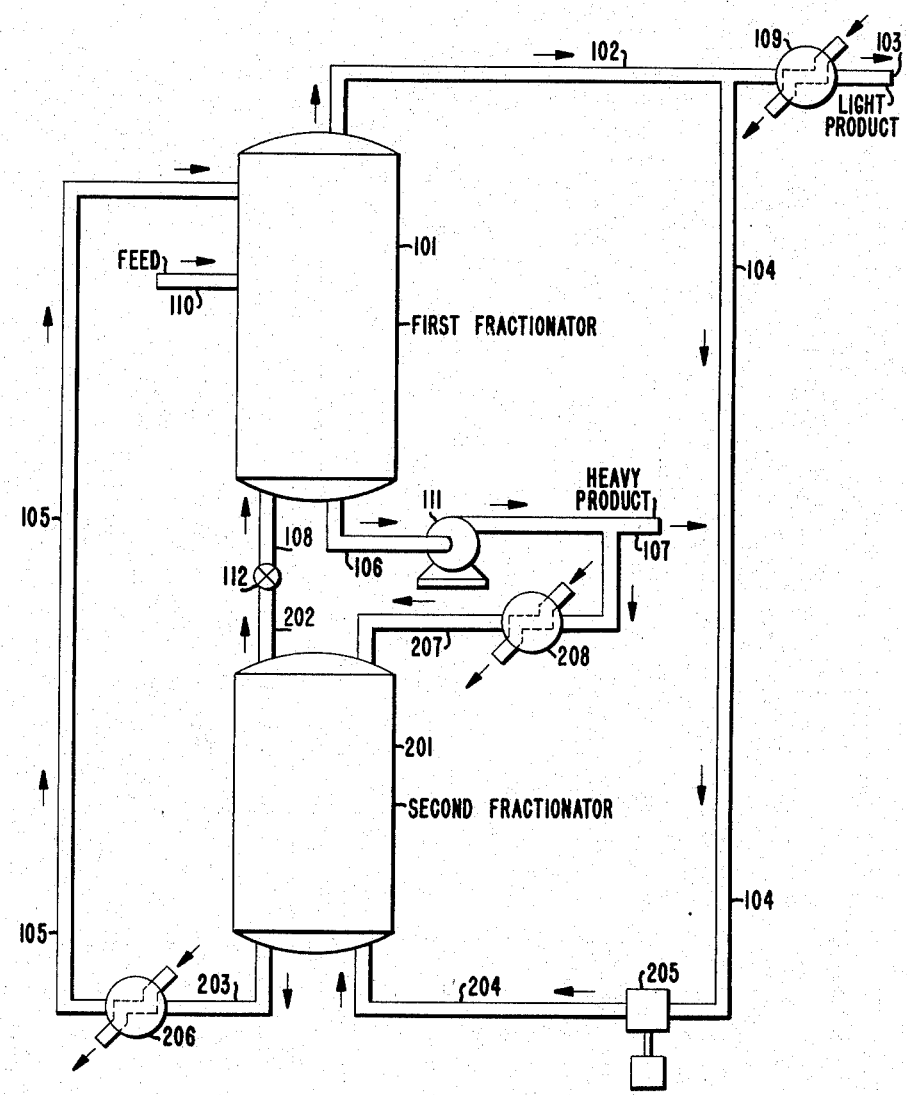

Aug. 25, 1959   I. KIRSHENBAUM ET AL   2,901,406
SEPARATION OF LIQUIDS BY ALTERING THEIR RELATIVE VOLATILITIES
Filed Feb. 18, 1955   2 Sheets-Sheet 1

ISIDOR KIRSHENBAUM
FREDRICK LOWELL JONACH   INVENTORS
LEWIS D. ETHERINGTON

BY Richard N. Nagel ATTORNEY

United States Patent Office

2,901,406
Patented Aug. 25, 1959

2,901,406

SEPARATION OF LIQUIDS BY ALTERING THEIR RELATIVE VOLATILITIES

Isidor Kirshenbaum, Union, N.J., Fredrick Lowell Jonach, Kew Gardens, N.Y., and Lewis D. Etherington, Cranford, N.J., assignors to Esso Research and Engineering Company, a corporation of Delaware Application February 18, 1955, Serial No. 489,219

13 Claims. (Cl. 202—41)

This invention relates to an improved fractional distillation process, and more particularly to a fractional distillation process which is carried out in a plurality of separate zones, the relative volatilities of the components to be separated differing from one zone to another.

Reference is made to the co-pending application entitled "Separation of Hydrocarbons," Serial No. 198,716, filed December 1, 1950 (now U.S. Patent No. 2,702,826), of the same inventors, of which this application is a continuation in part.

The earlier application was concerned with the separation of fluids by adsorption and took advantage of changes in relative volatility or separation factors of the components of the mixture responsive to changes in temperature or pressure to facilitate desorption of the adsorbed material from the adsorbent.

The process of the present invention is concerned with fractional distillation, but is likewise concerned with the separation of components of a mixture utilizing at least two separate zones, each of which is operated under different conditions of temperature and pressure so that advantage may be taken of changes in the relative volatility of the components. According to the present invention, at least two separate fractionating towers are maintained under different conditions of temperature and/or pressure. The vapor product from the first tower, enriched in one component, is then passed to the bottom of the second tower and the heat from this vapor is used to strip the other component from the bottoms withdrawn from the first fractionating zone. This provides for a substantial economy in heat supply, as the only heat introduced into the second tower is preferably that supplied by the sensible heat and heat of vaporization of the overhead product from the first fractionating tower. The temperature and pressure of the second fractionating tower are maintained such that the liquid bottoms from the first tower are no longer an equilibrium composition and the hot overhead vapors serve to strip one of the components from this liquid mixture. In other words the function of the second fractionator is to upset the equilibrium of the liquid bottom composition by changing the pressure and temperature so as to significantly alter the relative volatility of the two components and allow the overhead stream to strip the liquid bottom from the first fractionator. Thus the second fractionator behaves like a reflux and reboiler but it is more economical because it does not involve the condensation of large volumes of vapor which must be reheated in conventional reflux operations.

As used in the ensuing specification and claims, the relative volatility of A to B means the ratio of the mol fraction of A in vapor form at equilibrium divided by the mol fraction of B in vapor form to the mol fraction of A in liquid form divided by the mol fraction of B in liquid form.

The present invention may be better understood by reference to the accompanying drawings. Figure 1 is a flow diagram representing schematically a typical arrangement of apparatus useful in the practice of the present invention.

Figure 2:
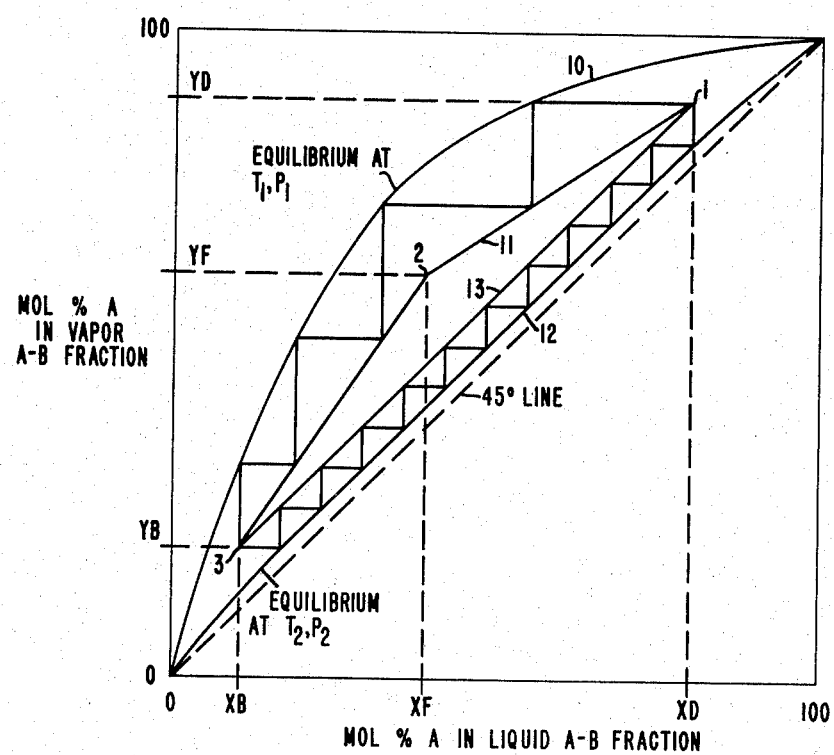

Figure 2 is a conventional McCabe-Thiele diagram graphically illustrating conditions existing in the fractionation zones wherein components A and B are separated, A being the relatively more volatile component in both cases, but the relative volatility of A to B being greater under one set of temperature and/or pressure conditions than under another.

Referring now specifically to the drawings, and particularly to Figure 1, there is illustrated a fractionating tower 101, into which a fluid mixture is fed through line 110. Fractionating tower 101 may be of any conventional design and is staged as by the provision of pierced plates, bubble cap trays, packing, or the like. For purposes of illustrating the invention, the process will be described with respect to the separation of two fluid components, A and B. Conditions of temperature and pressure in the tower 101 are controlled so that the relative volatility of A to B therein will be 6. In this example a vapor-liquid feed mixture of A and B is used. The mixture is fractionated in the tower and a gaseous overhead product containing 90 mol percent A and 10 mol percent B is removed via line 102. One portion of this vapor stream, consisting of 50 mols of mixture, is removed as a product and may be condensed in the heat exchanger 109 and product removed via line 103. Another portion, containing 100 mols of product, is passed through line 104 to the compressor 205 and thence through line 204 to the bottom of the second fractionating tower 201. Tower 201 is also a conventional fractionating tower and is staged similarly to fractionator 101. Temperature and pressure in tower 201 are different than in the first fractionating tower 101 and the relative volatility of A to B in tower 201 is 1.2 rather than 6. The hot vapor entering through line 204 rises upwardly through tower 201 countercurrent to the liquid bottoms product introduced from the first fractionator 101 via line 106 and pump 111. This latter stream is made up of 90 mol percent B and 10 mol percent A. The stream is divided and 50 mols removed as heavy product via line 107, whereas the remaining portion of 100 mols of mixture is fed through the heat exchanger 208 and line 207 into the top of tower 201. Fractionation takes place in tower 201, and a liquid stream consisting of 100 mols of a mixture of 80% A and 20% B is withdrawn from the bottom of second fractionator 201 via line 203. This liquid is passed through a cooler 206 and thence is recycled through line 105 to the top of the first fractionating tower 101. The streams in lines 203 and 207 may be heat exchanged against each other. One hundred mols of gaseous product which contains 80 mol percent B and 20 mol percent A is removed overhead through line 202. This gas may be passed through a flash valve 112 or may also be run through the impelling side of a gas turbine used for running a compressor before passing through line 108 into tower 101.

Because of the different conditions of temperature and pressure in the first fractionator 101 from those in fractionator 201, the vapor introduced via line 108 and containing 80 mol percent B and 20 mol percent A re-equilibrates with the liquid stream passing countercurrently down the tower and the vapor is enriched in A while rising upwardly through the tower.

It will be seen from the above description that the one advantage of the process of the present invention is that the second fractionator 201 may be operated without necessity of supplying heat from an external source. All the heat necessary for operating second fractionating tower 201 may be introduced by the overhead vapor passed to the bottom of the tower through line 204. Even in cases where it is desirable to heat the feed for tower 201, the amount of heat necessary is substantially less than that required for operating a conventional reboiler.

Certain modifications may be made in the arrangement illustrated in Figure 1. For example, a portion of the product withdrawn at 103 may be refluxed to the top of tower 101. Tower 101 may be provided also with internal heating means at any point below that at which feed is introduced, including a conventional reboiler. Heating or cooling means may be provided for tower 201 at any point.

Instead of passing stream 104 through the compressor 205, it may, in some instances, be condensed, reboiled, and introduced into the bottom of tower 201 as a vapor.

The situation existing in the fractionators 101 and 201 is illustrated by the conventional McCabe-Thiele diagram shown in Figure 2. Here the upper curve 10 represents the vapor-liquid equilibrium relation existing in the first fractionating tower 101, wherein the relative volatility of A to B is 6. The operating line 11 represents the material balance relation existing in tower 101. The curve 12 represents the vapor-liquid equilibrium relation existing in tower 201, wherein the relative volatility of A to B is 1.2. The operating line 13 represents the material balance situation in tower 201. Point 1 corresponds to the top of tower 101 and bottom of 201. Point 2 corresponds to feed point 101, and point 3 corresponds to bottom of 101 and top of 201. Tower 101 is shown to have four theoretical stages. If, however, the feed consisted only of saturated vapor, tower 101 would contain five stages and additional cooling would be necessary, as, for example, by vapor condensation in tower 201.

The process of the present invention may be applied to the separation of materials which form constant-boiling mixtures. In such cases, a constant-boiling mixture will be withdrawn as one of the products. Similar utility savings may be effected as when the invention is applied to conventional fractional distillations.

The present invention is applicable to the separation of any fluid constituents where the relative volatility of the constituents is responsive to changes in temperature or pressure or a combination of these two variables. An example of a mixture amenable to separation by this method is methane and ethane. The variation in relative volatility with temperature-pressure conditions is shown in Table I below.

*Table I*

| Pressure Atmospheres | Temperature, °F. | Relative Volatility of Methane to Ethane |
|---|---|---|
| 8 | −140 | 26 |
| 25 | −100 | 11 |

Table II below shows the variation of relative volatilities of propane and butane.

*Table II*

| Pressure Atmospheres | Temperature, °F. | Relative Volatility of Propane to Butane |
|---|---|---|
| 2 | 70 | 3.4 |
| 10 | 180 | 2.4 |

A typical non-hydrocarbon system to which the present invention is applicable is acetone-methyl ethyl ketone. The effect of temperature and pressure variations on relative volatility is shown in Table III below.

*Table III*

| Pressure Atmospheres | Mol percent of Acetone in Vapor at Equilibrium | Temperature, °F. | Relative Volatility of Acetone to Methyl Ethyl Ketone |
|---|---|---|---|
| 1 | 29.0 | 165 | 2.3 |
| 1 | 71.5 | 147 | 2.1 |
| 1 | 90.0 | 138 | 2.1 |
| 33 | 29.5 | 460 | 1.2 |
| 33 | 69.0 | 437 | 1.2 |
| 33 | 93.0 | 420 | 1.3 |

A system in which the relative volatility of the two components can be reversed rather than merely altered is typified by acetone and water. Data showing the relative volatility of these components with respect to variations in temperature and pressure are presented in Table IV below.

*Table IV*

| Pressure Atmospheres | Mol percent of Acetone in Equilibrium Vapor | Temperature, °F. | Relative Volatility of Acetone to Water |
|---|---|---|---|
| 1 | 83 | 140 | 6 |
| 1 | 90 | 135 | 2.5 |
| 6 | 78 | 258 | 1.2 |
| 6 | 91 | 258 | 0.85 |
| 33 | 53 | 407 | 1.6 |
| 33 | 75 | 407 | 0.8 |
| 33 | 92 | 412 | 0.76 |

Other typical systems to which the process is applicable include the methyl ethyl ketone-water and acetone-methanol systems. In a typical operation of this invention component A was acetone and component B was water. The pressure in the first fractionator was 1 atmosphere and the temperature was 140° F. The pressure in the second fractionator was 6 atmospheres and the temperature 258° F. Under these conditions the relative volatility of acetone to water in the first fractionator was 6 while in the second fractionator it was 0.85.

In another operation component A was acetone and component B was methyl ethyl ketone. The pressure and temperature of the first fractionator were 1 atmosphere and 165° F., respectively. The pressure and temperature of the second fractionator were 33 atmospheres and 437° F., respectively. The relative volatilities of acetone to methyl ethyl ketone in the first and second fractionators were 2.3 and 1.2, respectively.

Still another example of the present invention was where component A was methane and component B was ethane. In this example the pressure and temperature of the first fractionator were 8 atmospheres and −140° F., respectively. The pressure and temperature of the second fractionator were 25 atmospheres and −100° F., respectively. The relative volatilities of the first and second fractionators were 26 and 11, respectively.

For purposes of illustration a process employing two separate fractionating zones or towers has been illustrated. It will be understood, of course, that the number of zones employed can be multiplied beyond two. However, the additional advantage obtained by such an increase in fractionating stages is not particularly great. It will be understood, of course, that although the process of the present invention has been described with respect to the separation of specific materials, the invention includes all systems in which relative volatility of components separable by distillation is responsive to changes in either temperature or pressure. The products may be pure components, streams enriched in one or more components, or a constant-boiling mixture. The invention is also applicable to a process involving both distillation and adsorption. This modification is especially applicable to a multi-component system wherein some of the components are separated in the distillation stages and others in the adsorption stages. The invention is also intended to cover those equivalents that will occur to those skilled in the art.

What is claimed is:

1. A process for separating a fluid mixture of components A and B in which the relative volatility of A to B is responsive to changes in a thermodynamic variable of the class temperature and pressure, comprising the steps of introducing said mixture into a first fractionating zone, maintaining conditions in said first zone such that A is more volatile than B, withdrawing a first vapor product from the top of said zone and passing a portion thereof to the bottom of a second fractionating zone, withdrawing a first liquid product enriched in B from the bottom of said first zone and introducing a portion thereof into the top of said second zone, adjusting a thermodynamic variable of the class temperature and pressure in said second zone so that A is relatively less volatile than it was in said first zone, contacting said first liquid product with said first vapor product in said second fractionating zone, whereby B is stripped from said first liquid product to form a second vapor product enriched in B and a second liquid product enriched in A, recycling said second liquid product to the top of said first zone, and passing said second vapor product to the bottom of said first zone.

2. The process according to claim 1 wherein B is more volatile than A in said second zone.

3. The process according to claim 1 wherein A is more volatile than B in said second zone.

4. The process according to claim 1 wherein A and B have substantially the same volatility in said second zone.

5. The process according to claim 1 wherein the temperature and pressure in said second zone are different from the temperature and pressure in said first zone.

6. The process according to claim 1 wherein the portion of the first vapor product passed to the bottom of said second fractionating zone is introduced therein at substantially the same temperature at which it is withdrawn from the top of said first zone.

7. The process according to claim 1 wherein A is methane and B is ethane.

8. The process according to claim 1 wherein A is propane and B is butane.

9. The process according to claim 1 wherein A is acetone and B is methyl ethyl ketone.

10. The process according to claim 1 wherein A is acetone and B is water.

11. The process according to claim 1 wherein A is methyl ethyl ketone and B is water.

12. The process according to claim 1 wherein A is acetone and B is methanol.

13. A process for separating a fluid mixture of components A and B in which the relative volatility of A to B is responsive to changes in a thermodynamic variable of the class temperature and pressure, comprising the steps of fractionally distilling said mixture in a first fractionating tower under conditions of temperature and pressure such that A is more volatile than B, withdrawing a first vapor product enriched in A from the top of said first tower, and a first liquid product enriched in B from the bottom of said first tower, withdrawing portions of said products from said first tower and contacting them countercurrently in a second fractionating tower, maintaining conditions in said second tower such that B is more volatile than A, whereby said first vapor product strips B from said first liquid product, withdrawing a second vapor product enriched in B and a second liquid product enriched in A from said second tower and contacting said second products countercurrently in said first tower.

References Cited in the file of this patent

UNITED STATES PATENTS

| 1,676,700 | Lewis | July 10, 1928 |
| 1,822,455 | Ricard et al. | Sept. 8, 1931 |
| 2,500,934 | Dean | Mar. 21, 1950 |
| 2,550,446 | Blohm et al. | Apr. 21, 1951 |
| 2,640,013 | Wilton | May 26, 1953 |
| 2,702,826 | Kirshenbaum et al. | Feb. 22, 1955 |

FOREIGN PATENTS

| 458,152 | Great Britain | Dec. 14, 1936 |
| 600,574 | Great Britain | Apr. 13, 1948 |

OTHER REFERENCES

Horsley: "Azeotropic Data," June 1952, Div. 25.